UNITED STATES PATENT OFFICE.

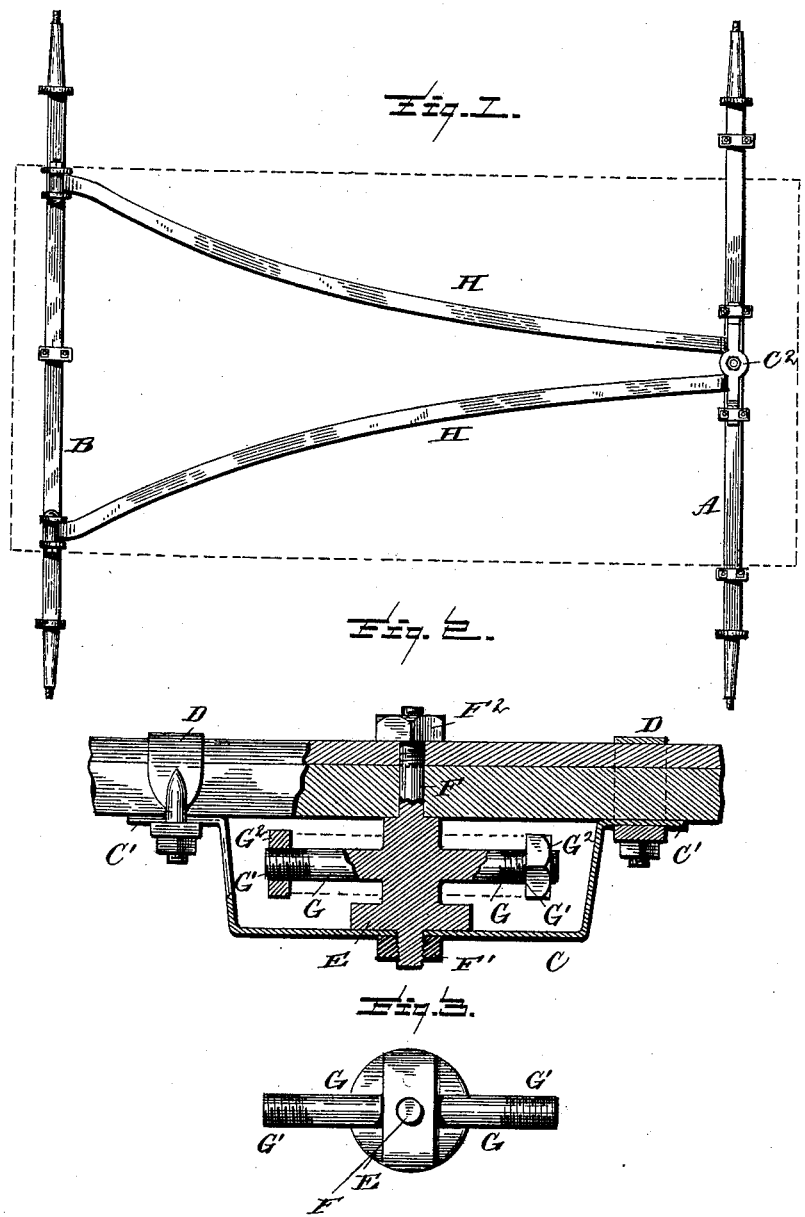

LEWIS F. CASE, JR., OF GOSHEN, INDIANA.

KING-BOLT FOR VEHICLES.

SPECIFICATION forming part of Letters Patent No. 429,753, dated June 10, 1890.

Application filed November 14, 1889. Serial No. 330,280. (No model.)

*To all whom it may concern:*

Be it known that I, LEWIS F. CASE, Jr., a citizen of the United States, residing at Goshen, in the county of Elkhart, State of Indiana, have invented certain new and useful Improvements in King-Bolts, of which the following is a specification, reference being had therein to the accompanying drawings.

This invention relates to certain new and useful improvements in running-gear for vehicles, and more particularly to the circle and king-bolt and the manner of connection thereof with the side spring; and it has for its object, among others, to provide a simple and efficient combined circle and king-bolt.

The invention in the present instance resides in the peculiarities of construction and the novel combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a bottom plan of a portion of the running-gear of a vehicle embodying my invention. Fig. 2 is a side elevation, partly in longitudinal section, of the combined circle and king-bolt attached to the axle. Fig. 3 is a top plan of the circle removed.

Like letters of reference indicate like parts in all the views.

Referring now to the details of the drawings by letter, A designates the front and B the rear axle, both of known construction, and upon which and suitable wheels (not shown) the body (indicated by dotted lines in Fig. 1) is adapted to be supported in any well-known manner. The shafts (not shown) are designed to be rigidly fastened to the front axle in any well-known way.

Centrally to the under side of the front axle there is secured a substantially U-shaped support C, having lateral portions or arms C', which extend in opposite directions upon the under side of the axle and secured thereto by means of suitable clips D of any known construction. This support C is provided centrally in its horizontal portion with the enlarged or circular portion $C^2$, upon which rests and is designed to be rotated the combined circle and king-bolt.

The combined circle and king-bolt consists of the body portion E, having formed integral therewith the diametrically-opposite arms G, the outer ends of which are screw-threaded, as shown at G', to receive the nuts $G^2$, as shown in Fig. 2. Integral with the body portion is the vertical extension F, extending beyond the body portion both at the top and bottom and screw-threaded at its ends to receive the nuts F' and $F^2$. The upper shoulder on the body portion bears upon the under side of the axle, and the shoulder at the lower end of the said body portion rests upon the support C. Instead of having the upper extension of the body portion pass entirely through the axle and receive a nut, I may sometimes make it of such length as to extend only partially up into the axle, as indicated by dotted lines in Fig. 2, but prefer that it extend entirely through the axle and receive a nut, as shown in full lines in said Fig. 2. The body portion is of such a length, or rather height, as to fill the space between the under side of the axle and the upper face of the support C.

H are springs secured at their rear ends to the rear axle in any suitable manner and at their forward ends formed with eyes or any other provisions by which they are attached to the lateral arms G of the body portion and removably held thereon by means of the nuts $G^2$.

In assembling the parts the upper extension of the body portion is inserted in an opening therefor in the axle and held in its place by the nut upon the upper end thereof. The support C is then put in place and secured to the axle by its clips, and then the nut F' placed upon the lower end of the extension F and screwed up. It will thus be seen that I provide a simple and efficient cheap circle and king-bolt of few parts, and hence manufactured at a minimum cost and not liable to get out of order.

What I claim as new is—

1. The combination, with the front axle and a support upon the under side thereof, of the combined circle and king-bolt supported upon said support between the same and the under side of the axle and rotatable, substantially as described.

2. The combination, with the front axle and a support upon the under side thereof, of a combined circle and king-bolt in a single piece arranged between the support and axle and formed with lateral arms, substantially as and for the purpose specified.

3. The combination, with the front axle and a support attached to the under side thereof, of the combined circle and king-bolt arranged between the support and axle and formed with lateral arms and with vertical extensions passed through the support and into the axle, substantially as described.

4. The combination, with the front axle and the support upon the under side thereof, of the body portion between the support and axle and formed with lateral arms and with vertical extensions passed through the support and into the axle, and the springs having their forward ends attached to the lateral arms, substantially as described.

5. The combination, with the axle and the support upon the under side thereof, of the circle and king-bolt arranged between the axle and support and formed with integral lateral arms screw-threaded and vertical screw-threaded extensions, the vertical extensions being passed through the support and axle and provided with nuts upon the extended ends, and the springs having their forward ends upon the lateral arms, and removable nuts for holding the same in place, substantially as described.

In testimony whereof I affix my signature in presence of two witnesses.

LEWIS F. CASE, Jr.

Witnesses:
JAMES H. SHOWALTER,
AMELIA R. THOMAS.